(12) United States Patent
Alwan et al.

(10) Patent No.: US 10,926,806 B2
(45) Date of Patent: Feb. 23, 2021

(54) VEHICLE TORQUE BOX ASSEMBLY

(71) Applicant: Ford Global Technologies, LLC, Dearborn, MI (US)

(72) Inventors: Jamil M. Alwan, Ann Arbor, MI (US); Djamal Eddine Midoun, Ann Arbor, MI (US); Shekar Prabhakar Erasala, Northville, MI (US); Pavan Nagaraj, Dearborn, MI (US); Vladimir Vladimirovich Bogachuk, West Bloomfield, MI (US); Shawn Michael Morgans, Chelsea, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 63 days.

(21) Appl. No.: 16/416,549

(22) Filed: May 20, 2019

(65) Prior Publication Data
US 2020/0369321 A1    Nov. 26, 2020

(51) Int. Cl.
| | | |
|---|---|---|
| *B62D 25/08* | (2006.01) | |
| *B62D 21/15* | (2006.01) | |
| *B62D 25/20* | (2006.01) | |
| *B62D 25/14* | (2006.01) | |
| *B62D 25/02* | (2006.01) | |

(52) U.S. Cl.
CPC .......... *B62D 25/08* (2013.01); *B62D 21/152* (2013.01); *B62D 25/025* (2013.01); *B62D 25/14* (2013.01); *B62D 25/2018* (2013.01)

(58) Field of Classification Search
CPC  B62D 25/025; B62D 25/2018; B62D 21/152; B62D 21/155; B62D 25/08
USPC ....... 296/203.01, 203.03, 204, 187.09, 187.1
See application file for complete search history.

(56) References Cited

U.S. PATENT DOCUMENTS

| | | | |
|---|---|---|---|
| 6,364,358 B1 | 4/2002 | Miller | |
| 6,631,942 B1 * | 10/2003 | Kitagawa | B62D 21/152 |
| | | | 296/187.1 |
| 8,469,442 B1 | 6/2013 | Pencak et al. | |
| 9,079,619 B2 | 7/2015 | Gupta et al. | |
| 9,233,716 B2 | 1/2016 | Midoun et al. | |
| 9,394,005 B1 | 7/2016 | Enders | |
| 9,669,784 B2 | 6/2017 | Jensen et al. | |
| 9,688,311 B2 | 6/2017 | Yamamoto et al. | |
| 9,694,853 B2 | 7/2017 | Craig et al. | |
| 9,821,853 B2 | 11/2017 | Torikawa et al. | |
| 10,077,014 B1 | 9/2018 | Chiang et al. | |
| 10,421,493 B2 * | 9/2019 | Saje | B62D 25/025 |

* cited by examiner

*Primary Examiner* — Dennis H Pedder
(74) *Attorney, Agent, or Firm* — Frank A. MacKenzie; Bejin Bieneman PLC

(57) ABSTRACT

An assembly includes an inner rail and a rocker rail outboard of the inner rail. The assembly includes a torque box having a first panel fixed to the inner rail and the rocker rail, a second panel fixed to the inner rail and the rocker rail, and a third panel fixed to the inner rail and the rocker rail.

20 Claims, 5 Drawing Sheets

VEHICLE TORQUE BOX ASSEMBLY

BACKGROUND

A vehicle may include a torque box assembly. The torque box is typically connected to a frame rail and a rocker rail of the vehicle. Torque boxes reduce vibrations and chassis flex of the vehicle.

DETAILED DESCRIPTION

Figure 1:
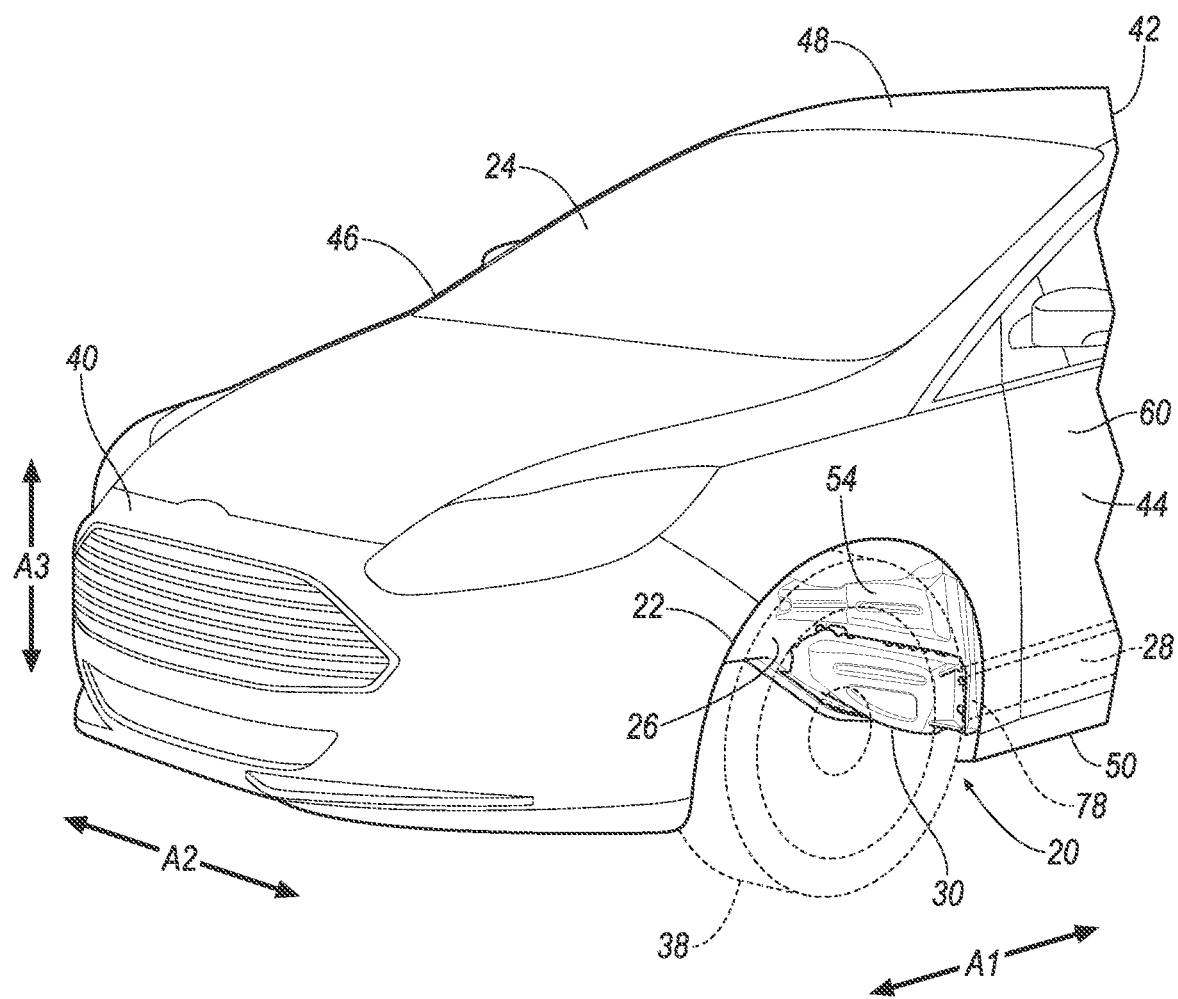
FIG. 1 is a perspective view of a vehicle having a torque box assembly.

An assembly includes an inner rail and a rocker rail outboard of the inner rail. The assembly includes a torque box having a first panel fixed to the inner rail and the rocker rail, a second panel fixed to the inner rail and the rocker rail, and a third panel fixed to the inner rail and the rocker rail.

The second panel may be between the first panel and the third panel relative to a vehicle-longitudinal axis.

The assembly may include a floor supported by the inner rail and the rocker rail.

The third panel may be fixed to the floor.

The assembly may include a wheel well and a door, the torque box between the wheel well and the door relative to a vehicle-longitudinal axis.

The third panel may include a plurality of bends elongated along a cross-vehicle axis.

The third panel may include an opening.

The third panel may include a flange surrounding the opening.

The first panel may include a depression.

The depression may be elongated along a cross-vehicle axis.

The depression may be triangular.

The second panel may include a second depression.

The first panel and the third panel may be fixed to the second panel.

The first panel, the second panel, and the third panel may each include a top edge, the top edge of the first panel fixed to the top edge of the second panel, the top edge of the third panel spaced from the top edge of the first panel and the top edge of the second panel.

The assembly may include a dash cross member, the first panel and the second panel fixed to the dash cross member.

The third panel may be spaced from the dash cross member.

The third panel may include vertical portions and a horizontal portion extending between the vertical portions.

The third panel may include tabs extending from each of the vertical portions and the horizontal portion, the tabs fixed to the inner rail.

The first panel, the second panel, and the third panel may each include a top edge and a bottom edge, the top edges spaced from the bottom edges relative to a vehicle-vertical axis.

An assembly includes a dash cross member. The assembly includes an inner rail. The assembly includes a rocker rail outboard of the inner rail. The assembly includes a floor supported by the inner rail and the rocker rail. The assembly includes a torque box having a first panel fixed to the inner rail and the rocker rail, a second panel fixed to the inner rail and the rocker rail, and a third panel fixed to the inner rail and the rocker rail. The first panel, the second panel, and the third panel each include a top edge, the top edge of the first panel fixed to the top edge of the second panel and to the dash cross member, the top edge of the third panel spaced from the top edge of the first panel and the top edge of the second panel and fixed to the floor.

With reference to the Figures, wherein like numerals indicate like parts throughout the several views, an assembly 20 for providing increased strength behind a wheel well 22 of a vehicle 24 includes an inner rail 26 and a rocker rail 28 outboard of the inner rail 26. The assembly 20 includes a torque box 30 having a first panel 32 fixed to the inner rail 26 and the rocker rail 28, a second panel 34 fixed to the inner rail 26 and the rocker rail 28, and a third panel 36 fixed to the inner rail 26 and the rocker rail 28.

The torque box 30 provides increased strength to the vehicle 24 behind the wheel well 22. The increased strength provided by the torque box 30 absorbs energy from a wheel 38 of the vehicle 24, e.g., during an impact to the vehicle 24. The torque box 30 may enable the vehicle 24 to have better performance in a standardized crash test, such as a small offset rigid barrier frontal crash test.

In the following description, relative orientations and directions (by way of example, top, bottom, front, rear, forward, rearward, upward, downward, outboard, inboard, inward, outward, lateral, left, right, etc.) are from the perspective of an occupant seated in a seat, facing a dashboard of the vehicle 24. Orientations and directions relative to the assembly 20 are given relative to when the assembly 20 is supported by the vehicle 24 as described below and shown in the Figures.

The vehicle 24 may be any type of passenger or commercial automobile such as a car, a truck, a sport utility vehicle, a crossover vehicle, a van, a minivan, a taxi, a bus, etc.

The vehicle 24 defines a vehicle-longitudinal axis A1, e.g., extending between the front 40 and a rear 42 of the vehicle 24. The vehicle 24 defines a cross-vehicle axis A2, e.g., extending between a left side 44 and a right side 46 of the vehicle 24. The vehicle 24 defines a vehicle-vertical axis A3, e.g., extending between a top 48 and a bottom 50 of the vehicle 24. The vehicle-longitudinal axis A1, the cross-vehicle axis A2, and the vehicle-vertical axis A3 are perpendicular to each other.

The vehicle 24 may be of a unibody construction. In the unibody construction, components of the frame and body of the vehicle 24, e.g., the inner rails 26, the rocker rails 28, a floor 52 (shown in FIGS. 4 and 5), a dash cross member 54, etc., serve as the frame, and the body is unitary, i.e., a continuous one-piece unit. As another example, the frame may have a body-on-frame construction (also referred to as a cab-on-frame construction). In other words, the body and frame are separate components, i.e., are modular, and the body is supported on and affixed to the frame. Alternatively, the frame may have any suitable construction. The frame may be formed of any suitable material, for example, steel, aluminum, etc.

The wheel wells 22 house the wheels 38. The wheel wells 22 may have an arch shape that is open on an outboard side and enclosed on an inboard side. Two wheel wells 22 may be on each of the right side 46 and the left side 44 of the vehicle 24, e.g., with one at the front 40 and one at the rear 42 of each side 44, 46.

The vehicle 24 includes a door 60 (shown in FIG. 1) that selectively provides entry and egress to and from the vehicle 24. The door 60 is above the rocker rail 28. The door 60 is between the wheel 38 and the wheel well 22 at the front of the vehicle 24 and the wheel 38 and the wheel well 22 at the rear of the vehicle 24.

The inner rails 26 provide rigidity to the vehicle 24 and support other vehicle components. The inner rails 26 are elongated along the vehicle-longitudinal axis A1. The inner rails 26 may extend from the front of the vehicle 24 to the rear of the vehicle 24. In other words, the inner rails 26 may extend from in front of the wheel wells 22 at the front 40 of the vehicle 24 to behind the wheels 38 wells at the rear 42 of the vehicle 24. The inner rails 26 may be tubular, e.g., hollow and rectangular in cross-section, or any suitable shape. For example, the inner rails 26 may be frame rails or sled runner rails. The inner rails 26 may be steel, aluminum, or any suitable material.

The inner rails 26 may include a top surface 62 (shown in FIGS. 2 and 5), e.g., facing upward. The inner rails 26 may include a bottom surface 64 (shown in FIG. 3), e.g., facing downward. The inner rails 26 may include an inboard surface 66, e.g., facing inboard. The inner rails 26 may include an outboard surface 68, e.g., facing outboard.

The rocker rails 28 provide rigidity at the right side 46 and the left side 44 of the vehicle 24 and support other vehicle components, such as the doors 60. The rocker rails 28 are outboard of the inner rails 26. In other words, the inner rails 26 are between the rocker rails 28 relative to the cross-vehicle axis A2. The rocker rails 28 are elongated along the vehicle-longitudinal axis A1. One rocker rail 28 may extend between the wheel wells 22 of each side 44, 46 of the vehicle 24, e.g., along the vehicle-longitudinal axis A1.

The rocker rails 28 may include a top surface 70 (shown in FIGS. 2 and 3), e.g., facing upward. The rocker rails 28 may include a bottom surface 72 (shown in FIG. 5), e.g., facing downward. The rocker rails 28 may include an inboard surface 74, e.g., facing inboard. The rocker rails 28 may include an outboard surface 76, e.g., facing outboard. The rocker rails 28 may include front distal ends 78 and rear distal ends spaced from each other along the vehicle-longitudinal axis A1.

The floor 52 of the vehicle 24 supports objects within the passenger cabin, e.g., seats. The floor 52 may have portions that are generally planar, e.g., extending along the vehicle-longitudinal axis A1 and the cross-vehicle axis A2. The floor 52 may have portions that are curved, e.g., defining a tunnel to house a transmission, a drive axle, etc. The floor 52 may include structures to increase rigidity and strength, e.g., ribs, depressions, beams, etc. The floor 52 may be supported by the inner rails 26 and the rocker rails 28. For example, the floor 52 may be on top of and fixed to the inner rails 26 and the rocker rails 28, e.g., via fastener, weld, etc. The floor 52 may be steel, aluminum, or any suitable material.

The dash cross member 54 provides rigidity to the vehicle 24 along the cross-vehicle axis A2 and supports other vehicle components, such as an instrument panel. The dash cross member 54 is in front of the passenger cabin. The dash cross member 54 may be elongated along the cross-vehicle axis A2. The dash cross member 54 may extend from the right side 46 of the vehicle 24 to the left side 44 of the vehicle 24. The dash cross member 54 may be steel, aluminum, or any suitable material.

The torque box 30 provides increased strength to the vehicle 24 rearward of the wheel well 22 at the front 40 of the vehicle 24 by connecting the inner rail 26 to the rocker rail 28, e.g., at the front distal end 78 of the rocker rail 28. The torque box 30 may be between the wheel well 22 and the door 60 relative to the vehicle-longitudinal axis A1. The torque box 30 may be steel, aluminum, or any suitable material. Each of the panels 32, 34, 36 of the torque box 30 may be a separate piece of material, e.g., individual pieces of stamped sheet metal fixed to each other as described below.

The first panel 32 of the torque box 30 is forward of the second panel 34 and the third panel 36 relative to the vehicle-longitudinal axis A1. The first panel 32 includes a top edge 82 and a bottom edge 84. The top edge 82 is spaced from the bottom edge 84 relative to the vehicle-vertical axis A3. In other words, the top edge 82 is above the bottom edge 84. The first panel 32 may include a main portion 86. The main portion 86 may be generally planar and extend along the vehicle-vertical axis A3 and the cross-vehicle axis A2. The edges 82, 84 may be distal, i.e., the first panel 32 may terminate at the edges 82, 84.

The first panel 32 may include a top portion 88. The top portion 88 may be generally planar and extend along the vehicle-longitudinal axis A1 and the cross-vehicle axis A2. The top portion 88 may extend rearward from the main portion 86 to the top edge 82 of the first panel 32. The top portion 88 may include a flange 90 at the top edge 82.

The first panel 32 may include a bottom portion 92 that is below the top portion 88. The bottom portion 92 may be generally planar and extend along the vehicle-longitudinal axis A1 and the cross-vehicle axis A2. The bottom portion 92 may extend rearward from the main portion 86 to the bottom edge 84 of the first panel 32.

The first panel 32 may include an inboard portion 94. The inboard portion 94 may be generally planar and extend along the vehicle-longitudinal axis A1 and the vehicle-vertical axis A3. The inboard portion 94 may extend forward from the main portion 86 and upward from the top portion 88.

The first panel 32 may include an outboard portion 96 (shown in FIGS. 2 and 3) that is outboard of the inboard portion 94. The outboard portion 96 may be generally planar and extend along the vehicle-longitudinal axis A1 and the vehicle-vertical axis A3. The outboard portion 96 may extend rearward from the main portion 86, and may extend from the top portion 88 to the bottom portion 92. The outboard portion 96 may include a flange 98 and support ribs.

The first panel 32 may include one or more depressions 100a, 100b, e.g., in the main portion 86 of the first panel 32. The depressions 100a, 100b may extend rearward, i.e., toward the second panel 34. The depressions 100a, 100b increase strength and rigidity of the first panel 32. The depressions 100a, 100b may be elongated along the cross-vehicle axis A2. One of the depressions 100a may be above another of the depressions 100b. One of the depressions 100b may be triangular.

The first panel 32 is fixed to the inner rail 26, e.g., via fastener, weld, etc. For example, the inboard portion 94 of the first panel 32 may be fixed to the outboard surface 68 of the inner rail 26. As another example, the bottom portion 92 of the first panel 32 may be fixed to the bottom surface 64 of the inner rail 26.

The first panel 32 is fixed to the dash cross member 54, e.g., via fastener, weld, etc. For example, the flange 90 of the top portion 88 of the first panel 32 may be fixed to the dash cross member 54 at the top edge 82.

The first panel 32 is fixed to the rocker rail 28, e.g., via fastener, weld, etc. For example, the flange 98 of the outboard portion 96 of the first panel 32 may be fixed to the front distal end 78 of the rocker rail 28.

The second panel 34 of the torque box 30 is rearward of the first panel 32 and forward of the third panel 36 relative to the vehicle-longitudinal axis A1. In other words, the second panel 34 is between the first panel 32 and the third panel 36 relative to the vehicle-longitudinal axis A1. The second panel 34 includes a top edge 102 and a bottom edge 104 (shown in FIGS. 2 and 4). The top edge 102 is spaced from the bottom edge 104 relative to the vehicle-vertical axis A3. In other words, the top edge 102 is above the bottom edge 104. The edges 102, 104 may be distal, i.e., the second panel 34 may terminate at the edges 102, 104.

The second panel 34 may include a main portion 106. The main portion 106 may be generally planar and extend along the vehicle-vertical axis A3 and the cross-vehicle axis A2.

The second panel 34 may include an inboard flange 108 extending transversely from the main portion 106. The first panel 32 may include an outboard flange 110 extending transversely from the main portion 106 and outboard of the inboard flange 108. The second panel 34 may include a bottom flange 112 that extends rearward from the main portion 106.

The second panel 34 may include one or more depressions 114, e.g., in the main portion 106 of the second panel 34. The depressions 114 may extend forward, i.e., toward the first panel 32. The depressions 114 increase strength and rigidity of the second panel 34. The depressions 114 may be elongated along the cross-vehicle axis A2. One of the depressions 114 may be above another of the depressions 114.

The second panel 34 is fixed to the inner rail 26, e.g., via fastener, weld, etc. For example, the inboard flange 108 of the second panel 34 may be fixed to the outboard surface 68 of the inner rail 26.

The second panel 34 is fixed to the dash cross member 54, e.g., via fastener, weld, etc. For example, the main portion 106 of the second panel 34 may be fixed to the dash cross member 54 at the top edge 102.

The second panel 34 is fixed to the rocker rail 28, e.g., via fastener, weld, etc. For example, the outboard flange 110 of the second panel 34 may be fixed to the front distal end 78 of the rocker rail 28 (shown in FIGS. 2 and 5). As another example, the bottom flange 112 may be fixed to the bottom surface 72 of the rocker rail 28.

The top edge 82 of the first panel 32 is fixed to the top edge 102 of the second panel 34, e.g., via fastener, weld, etc. For example, the flange 90 of the top portion 88 of the first panel 32 may be fixed to the second panel 34 at the top edge 102 of the second panel 34.

Figure 2:
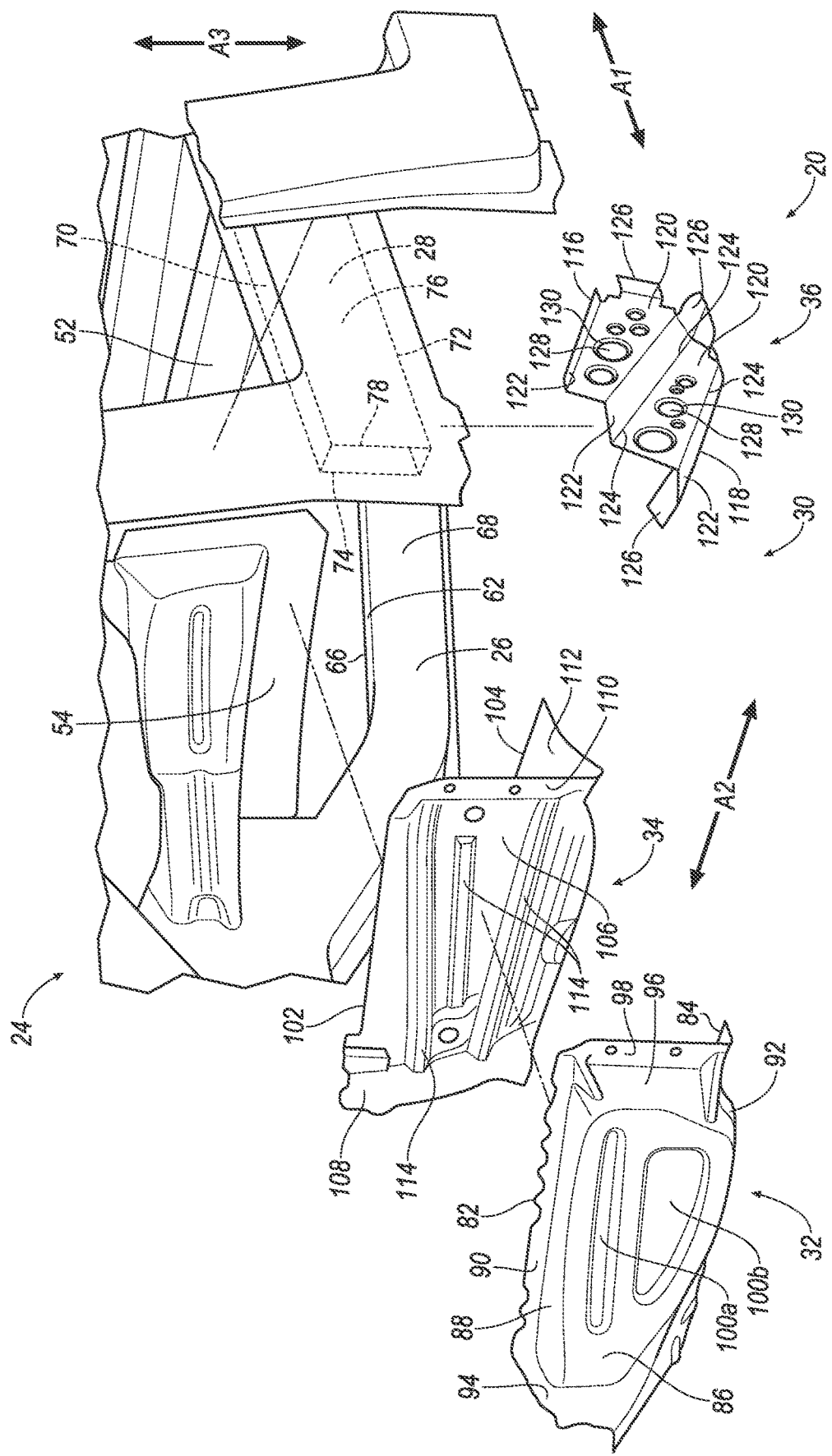
FIG. 2 is an exploded view of a portion of the vehicle including the torque box assembly.
Figure 3:
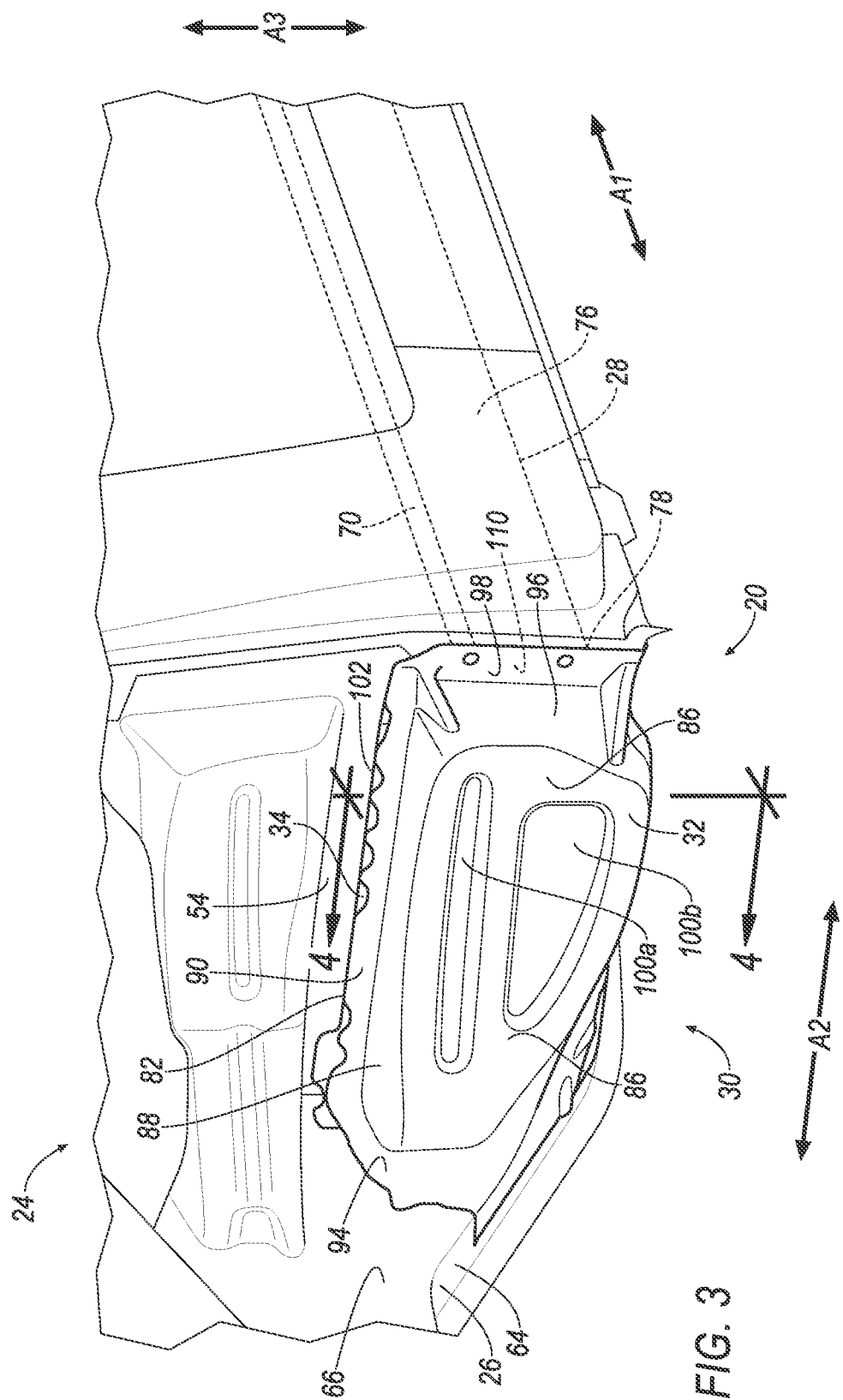
FIG. 3 is a perspective view of the portion of the vehicle including the torque box assembly.
Figure 4:
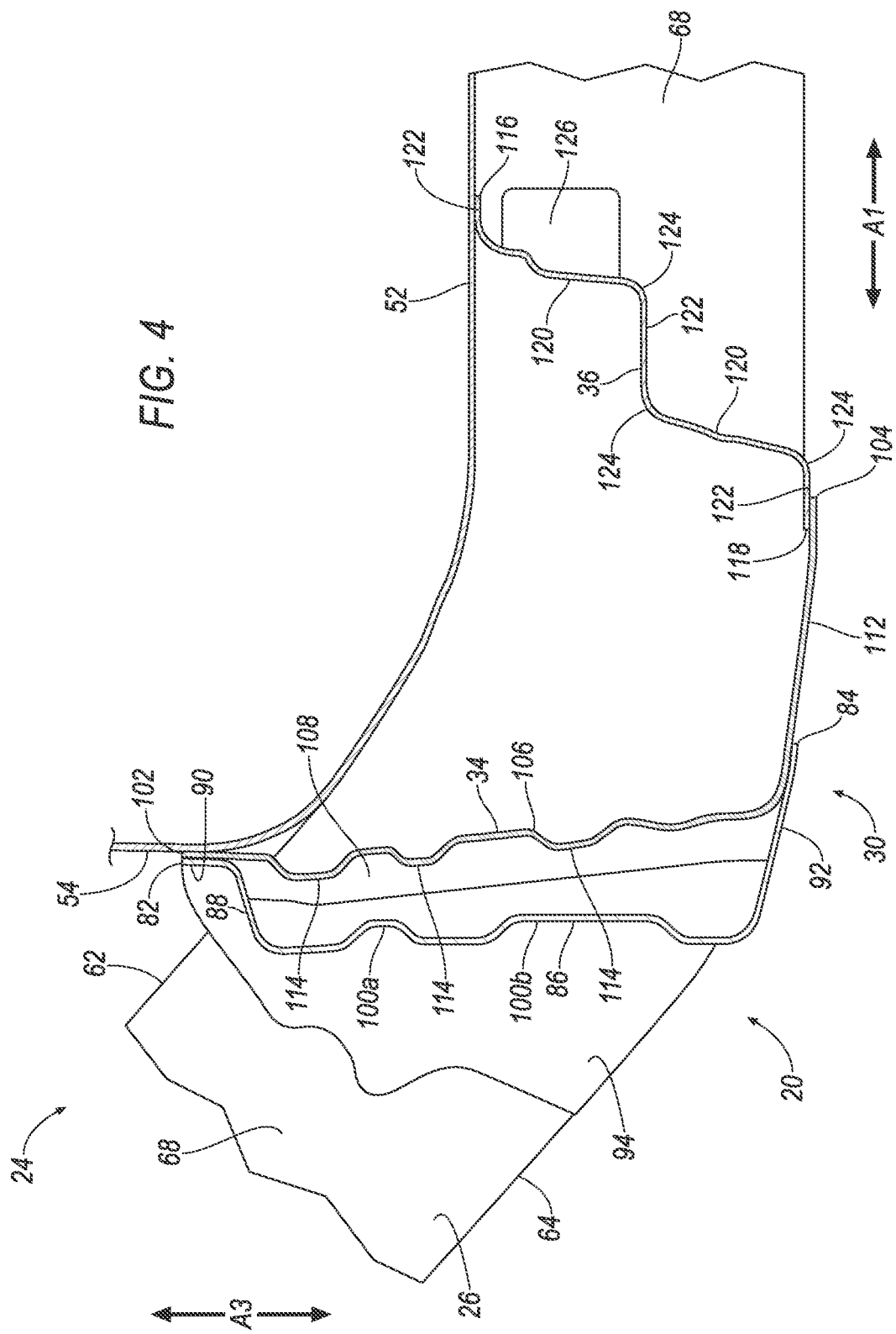
FIG. 4 is a cross section of the portion of the vehicle including the torque box assembly of FIG. 3.
Figure 5:
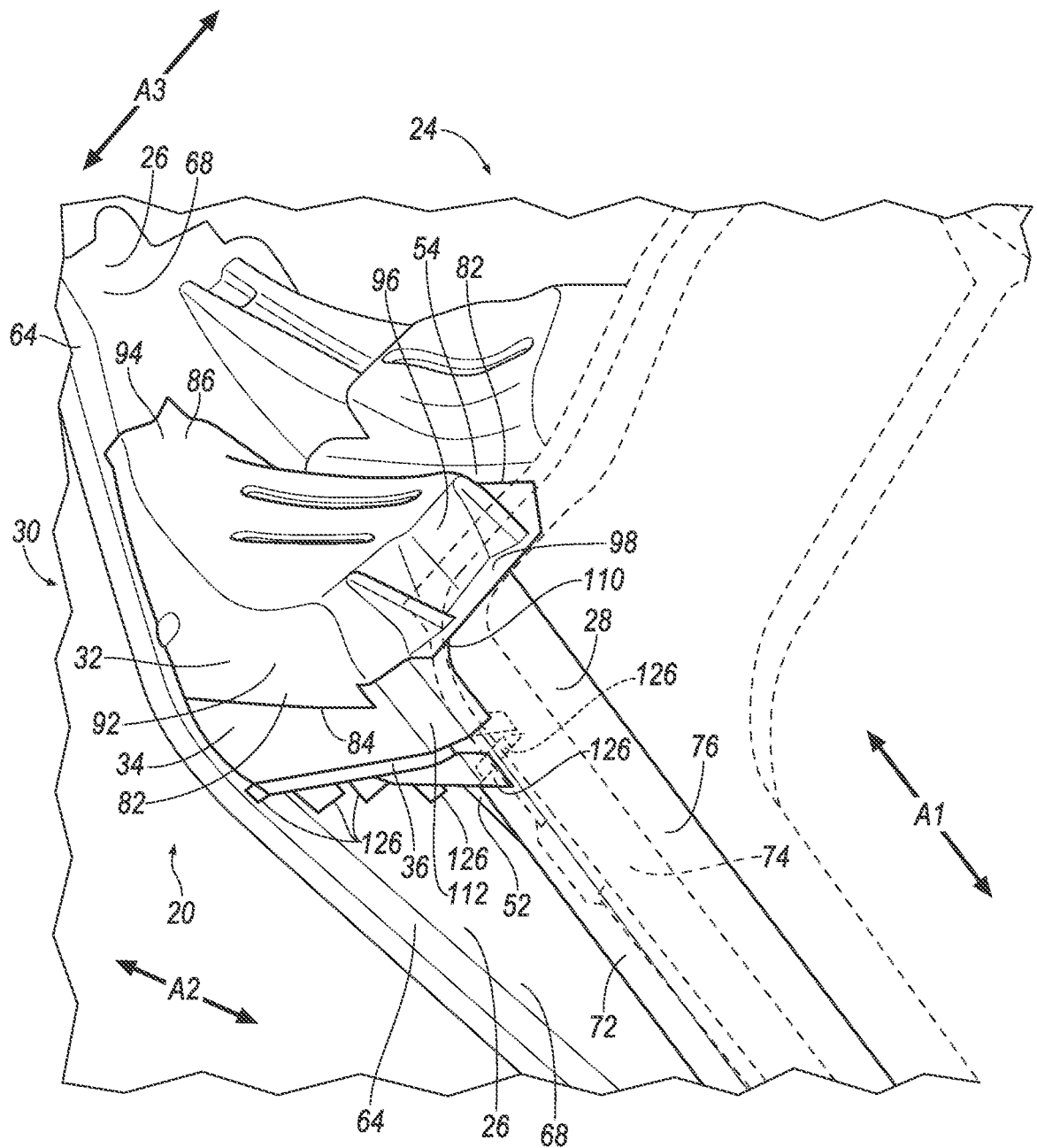
FIG. 5 is a bottom perspective view of the portion of the vehicle including the torque box assembly of FIG. 3.

The third panel 36 of the torque box 30 is rearward of the first panel 32 and the second panel 34 relative to the vehicle-longitudinal axis A1, as shown in FIGS. 2, 4 and 5. The third panel 36 includes a top edge 116 and a bottom edge 118. The top edge 116 is spaced from the bottom edge 118 relative to the vehicle-vertical axis A3. In other words, the top edge 116 is above the bottom edge 118. The bottom edge 118 may be forward of the top edge 116, e.g., closer to the second panel 34. The edges 116, 118 may be distal, i.e., the third panel 36 may terminate at the edges 116, 118.

The third panel 36 may include vertical portions 120. The vertical portions 120 may generally extend along the cross-vehicle axis A2 and the vehicle-vertical axis A3. The third panel 36 may include horizontal portions 122. The vertical portions 120 may generally extend along the cross-vehicle portions A2 and the vehicle-longitudinal axis A1. The horizontal portions 122 may extend between the vertical portions 120, and the vertical portions 120 may extend between the horizontal portions 122. In other words, the horizontal portions 122 and the vertical portions 120 may be in alternating arrangement.

The third panel 36 may include bends 124 between the horizontal portions 122 and the vertical portions 120. The bends 124 may be elongated along the cross-vehicle axis A2.

The third panel 36 may include tabs 126 at an inboard end and an outboard end of the third panel 36. The tabs 126 may extend from the vertical portions 120. The tabs 126 may extend from the horizontal portions 122.

The third panel 36 may include openings 128, shown in FIG. 2. The openings 128 reduce weight of the third panel 36. The third panel 36 may include flanges 130 surrounding the openings 128. The flanges 130 increase rigidity and strength of the third panel 36 at the openings 128. The openings 128 and flanges 130 may be in the vertical portions 120.

The third panel 36 is fixed to the inner rail 26, e.g., via fastener, weld, etc. For example, the tabs 126 at the inboard end of the third panel 36 may be fixed to the bottom surface 64 and/or the outboard surface 68 of the inner rail 26, as shown in FIGS. 4 and 5.

The third panel 36 is fixed to the rocker rail 28, e.g., via fastener, weld, etc. For example, tabs 126 at the outboard end of the third panel 36 may be fixed to the inboard surface 74 and/or the bottom surface 72 of the rocker rail 28, as shown in FIG. 5.

The third panel 36 is fixed to the floor 52, e.g., via fastener, weld, etc. For example, the horizontal portions 122 at the top edge 116 may be fixed to the floor 52, as shown in FIG. 4.

The third panel 36 is spaced from the dash cross member 54. In other words, the third panel 36 is free from contacting the dash cross member 54.

The top edge 116 of the third panel 36 is spaced from the top edge 82 of the first panel 32 and the top edge 102 of the second panel 34. In other words, the top edge 116 of the third panel 36 is free from contacting the top edge 82 of the first panel 32 and the top edge 102 of the second panel 34.

The first panel 32 and the third panel 36 are fixed to the second panel 34, e.g., via fastener, weld, etc. For example, the horizontal portion 122 at the bottom edge 118 of the of the third panel 36 may be fixed to the second panel 34 at the bottom edge 104 of the second panel 34. As another example, the bottom flange 112 of the second panel 34 may be fix to the bottom portion 92 of the first panel 32 at the bottom edge 84.

During an impact to the vehicle 24 the wheel 38 may be urged rearward into the torque box 30. The increased strength of the torque box 30 provided by the first panel 32, the second panel 34, and the third panel 36 (e.g., as compared to a traditional torque box) may cause the wheel 38 or fracture or otherwise deform, e.g., decreasing deformation of the vehicle 24, e.g., such as decreasing deformation of the dash cross member 54, rocker rails 28, etc., during the impact caused by the wheel 38 contacting the torque box 30.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
   an inner rail;
   a rocker rail outboard of the inner rail; and
   a torque box having a first panel fixed to the inner rail and the rocker rail, a second panel fixed to the inner rail and the rocker rail, and a third panel fixed to the inner rail and the rocker rail, and the third panel including vertical portions and a horizontal portion extending between the vertical portions.

2. The assembly of claim 1, wherein the second panel is between the first panel and the third panel relative to a vehicle-longitudinal axis.

3. The assembly of claim 1, further comprising a floor supported by the inner rail and the rocker rail.

4. The assembly of claim 3, wherein the third panel is fixed to the floor.

5. The assembly of claim 1, further comprising a wheel well and a door, the torque box between the wheel well and the door relative to a vehicle-longitudinal axis.

6. The assembly of claim 1, wherein the third panel includes a plurality of bends elongated along a cross-vehicle axis.

7. The assembly of claim 1, wherein the third panel includes an opening.

8. The assembly of claim 7, wherein the third panel includes a flange surrounding the opening.

9. The assembly of claim 1, wherein the first panel includes a depression.

10. The assembly of claim 9, wherein the depression is elongated along a cross-vehicle axis.

11. The assembly of claim 9, wherein the second panel includes a second depression.

12. The assembly of claim 1, wherein the first panel and the third panel are fixed to the second panel.

13. The assembly of claim 1, wherein the first panel, the second panel, and the third panel each include a top edge, the top edge of the first panel fixed to the top edge of the second panel, the top edge of the third panel spaced from the top edge of the first panel and the top edge of the second panel.

14. The assembly of claim 1, further comprising a dash cross member, the first panel and the second panel fixed to the dash cross member.

15. The assembly of claim 14, wherein the third panel is spaced from the dash cross member.

16. The assembly of claim 1, wherein the third panel includes tabs extending from each of the vertical portions and the horizontal portion, the tabs fixed to the inner rail.

17. The assembly of claim 1, wherein the first panel, the second panel, and the third panel each include a top edge and a bottom edge, the top edges spaced from the bottom edges relative to a vehicle-vertical axis.

18. An assembly, comprising:
    a dash cross member;
    an inner rail;
    a rocker rail outboard of the inner rail;
    a floor supported by the inner rail and the rocker rail; and
    a torque box having a first panel fixed to the inner rail and the rocker rail, a second panel fixed to the inner rail and the rocker rail, and a third panel fixed to the inner rail and the rocker rail;
    the first panel, the second panel, and the third panel each include a top edge, the top edge of the first panel fixed to the top edge of the second panel and to the dash cross member, the top edge of the third panel spaced from the top edge of the first panel and the top edge of the second panel and fixed to the floor.

19. An assembly, comprising:
    an inner rail;
    a rocker rail outboard of the inner rail;
    a torque box having a first panel fixed to the inner rail and the rocker rail, a second panel fixed to the inner rail and the rocker rail, and a third panel fixed to the inner rail and the rocker rail; and
    a dash cross member, the first panel and the second panel fixed to the dash cross member.

20. The assembly of claim 19, wherein the third panel is spaced from the dash cross member.

* * * * *